United States Patent
Song

(10) Patent No.: US 10,859,032 B2
(45) Date of Patent: Dec. 8, 2020

(54) CYLINDER HEAD AND METHOD FOR MANUFACTURING THE SAME

(71) Applicants: HYUNDAI MOTOR COMPANY, Seoul (KR); KIA MOTORS CORPORATION, Seoul (KR)

(72) Inventor: Oh Young Song, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 34 days.

(21) Appl. No.: 16/151,580

(22) Filed: Oct. 4, 2018

(65) Prior Publication Data
US 2020/0011266 A1 Jan. 9, 2020

(30) Foreign Application Priority Data

Jul. 9, 2018 (KR) .......................... 10-2018-0079363

(51) Int. Cl.
*F02F 1/42* (2006.01)
*B22D 25/02* (2006.01)
*F02F 1/24* (2006.01)

(52) U.S. Cl.
CPC ............ *F02F 1/4285* (2013.01); *B22D 25/02* (2013.01); *F02F 2001/245* (2013.01); *F02F 2200/06* (2013.01)

(58) Field of Classification Search
CPC .... F02F 1/4285; F02F 2001/245; B22D 25/02
See application file for complete search history.

(56) References Cited

U.S. PATENT DOCUMENTS 3,444,852 A 5/1969 Henry-Biabaud
2004/0221830 A1* 11/2004 Kuehner ............... F02F 1/4235
123/193.5

FOREIGN PATENT DOCUMENTS

KR 1474986 A 3/1967
KR 10-0233933 B1 12/1999

OTHER PUBLICATIONS

MDx Media (Jan. 30, 2016, https://youtu.be/ml2zz7BZBPw, "CNC Milling a cylinder head from a solid aluminum block"). (Year: 2016).*

* cited by examiner

Primary Examiner — Kevin A Lathers
(74) Attorney, Agent, or Firm — Brinks Gilson & Lione

(57) ABSTRACT

A method for manufacturing a cylinder head includes: preparing a cylinder head casting having an intake passage, an exhaust passage, and a combustion chamber by casting using a mold and a plurality of cores; machining an intake port, an intake valve seat, an intake valve guide bore, an exhaust port, an exhaust valve seat, and an exhaust valve guide bore in the cylinder head casting by a first cylindrical tool; and forming a tapered surface on a portion of edge of the intake port by a second cylindrical tool. In particular, the second cylindrical tool moves along a predetermined trajectory at the edge portion of the intake port and rotates around an axis simultaneously to machine the tapered surface.

4 Claims, 12 Drawing Sheets

CYLINDER HEAD AND METHOD FOR MANUFACTURING THE SAME

CROSS-REFERENCE TO RELATED APPLICATION

This application claims priority to and the benefit of Korean Patent Application No. 10-2018-0079363, filed on Jul. 9, 2018, the entire contents of which are incorporated herein by reference.

FIELD

The present disclosure relates to a cylinder head and a method for manufacturing the same.

BACKGROUND

The statements in this section merely provide background information related to the present disclosure and may not constitute prior art.

A cylinder head may have a complicated internal shape in which an intake passage, an intake port, an exhaust passage, an exhaust port, a combustion chamber, and the like are included, and may be manufactured by casting.

In general, as the cylinder head has a complicated structure including an intake passage, an intake port, an intake valve seat, an exhaust passage, an exhaust port, an exhaust valve seat, a combustion chamber, and the like, it may be manufactured by casting, cutting, and the like.

A process for manufacturing such a cylinder head will be detailed. A casting process using a mold and a plurality of cores may be performed to prepare a casting structure in which the intake passage, the exhaust passage, the combustion chamber, and the like are formed. Thereafter, the intake port, the intake valve seat, and an intake valve guide bore may be machined in the casting structure by a first cylindrical tool. Then, the exhaust port, the exhaust valve seat, and an exhaust valve guide bore may be machined in the casting structure by the first cylindrical tool.

Meanwhile, after machining of the intake port, the intake valve seat, and the intake valve guide bore, at least a portion of an edge of the intake port 7 may be machined by a second cylindrical tool to form a tapered surface 7a for improving the swirl and tumble ratio of the intake air as illustrated in FIG. 1. The second cylindrical tool may rotate around its axis at a portion of edge of the intake port 7 to form the crescent-shaped tapered surface 7a. In other words, the tapered surface 7a may be formed to have a crescent shape such that a width of each end portion of the tapered surface 7a may be smaller than a width of a central portion of the tapered surface 7a.

FIG. 1 illustrates a standard shape design for the crescent-shaped tapered surface 7a of the intake port 7, in which the tapered surface 7a has a designed width "w1" and a designed height "h1". Meanwhile, FIGS. 2 and 3 illustrate examples of shapes of tapered surfaces 7b and 7c of the intake port 7 that do not conform to the standard shape design of FIG. 1, due to manufacturing tolerance of the casting structure.

When the cylinder head is cast, an intake core for forming the intake passage may be slightly raised or lowered due to thermal load by the temperature of molten metal, deformation of the mold, the pressure of the molten metal, and the like. When the intake core is slightly raised, a gap between the intake passage and the combustion chamber may be greater than a designed value, and thus the tapered surface 7b of the intake port 7 may be formed to have a width "w2" and a height "h2", as illustrated in FIG. 2, which are larger than the width w1 and the height h1 of the tapered surface 7a illustrated in FIG. 1. When the intake core is slightly lowered, a gap between the intake passage and the combustion chamber may be greater than a designed value, and thus the tapered surface 7c of the intake port 7 may be formed to have a width "w3" and a height "h3", as illustrated in FIG. 3, which are smaller than the width w1 and the height h1 of the tapered surface 7a illustrated in FIG. 1.

As described above, due to the manufacturing tolerance of the cylinder head casting for the cylinder head, the shape of the intake port may not conform to the designed shape of the intake port so that a deviation with respect to the tapered surface of the intake port may occur severely. We have discovered that due to the shape deviation of the tapered surface of the intake port, the flow coefficient (CF) and tumble ratio of the intake air may vary, so that intermittent vibration and lurching of a vehicle (variation in RPM roughness) may occur, and the combustion characteristics may be severely changed.

The matters described in the background section are provided to assist in understanding the background of the present disclosure, and may include any technical concept which is not considered as the prior art known to those skilled in the art.

SUMMARY

The present disclosure addresses the above-mentioned problems occurring in the prior art while advantages achieved by the prior art are maintained intact.

An aspect of the present disclosure provides a cylinder head and a method for manufacturing the same, capable of keeping the shape of each intake port of a cylinder head uniform, regardless of casting tolerance of a cylinder head casting, thereby improving quality and reliability in the intake port of the manufactured cylinder head, and stabilizing the flow coefficient and tumble ratio of the intake air.

According to an aspect of the present disclosure, a method for manufacturing a cylinder head may include: preparing a cylinder head casting having an intake passage, an exhaust passage, and a combustion chamber by casting using a mold and a plurality of cores; machining an intake port, an intake valve seat, an intake valve guide bore, an exhaust port, an exhaust valve seat, and an exhaust valve guide bore in the cylinder head casting by a first cylindrical tool; and forming a tapered surface on at least a portion of an edge of the intake port by a second cylindrical tool. In particular, the second cylindrical tool moves along a predetermined trajectory at the portion of the edge of the intake port and rotates around an axis thereof simultaneously to machine the tapered surface.

The second cylindrical tool may have a diameter smaller than an inner diameter of the intake passage.

The first cylindrical tool may have a first cutting portion for cutting the intake valve guide bore, a second cutting portion for cutting the intake port, and a third cutting portion for cutting the intake valve seat.

The second cylindrical tool may have a diameter smaller than a diameter of the second cutting portion of the first cylindrical tool.

When the tapered surface is machined by the second cylindrical tool, an axis of the second cylindrical tool may intersect with an axis of the intake passage at a predetermined angle.

According to another aspect of the present disclosure, a cylinder head may include: a combustion chamber; an intake passage communicating with the combustion chamber; an intake port disposed between the intake passage and the combustion chamber; an intake valve seat disposed below the intake port; an intake valve which is movable along an intake valve guide bore to open and close the intake valve seat; and an arc-shaped tapered surface disposed on at least a portion of an edge of the intake port along a circumferential direction of the intake port, wherein one end of the tapered surface is provided with a first enlarged end portion, the other end of the tapered surface is provided with a second enlarged end portion, and the first and second enlarged end portions have a width greater than or equal to a width of a central portion of the tapered surface The tapered surface may be located opposite to the intake valve guide bore.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
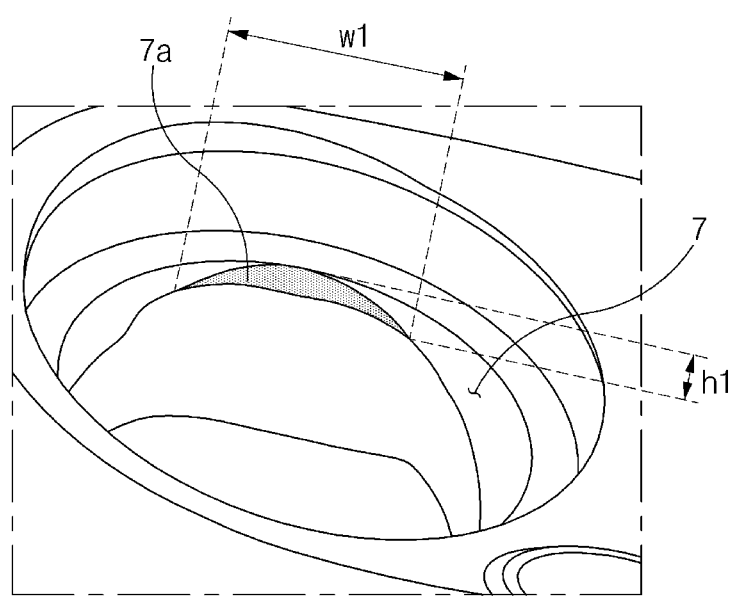
FIG. 1 illustrates a standard shape design for a tapered surface of an intake port of a cylinder head.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 4:
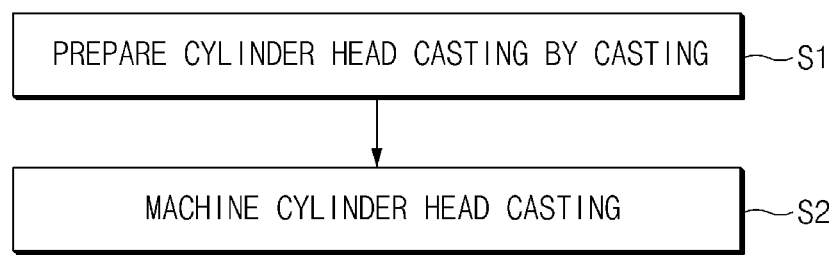
FIG. 4 illustrates a flowchart of a method for manufacturing a cylinder head according to an exemplary form of the present disclosure.

Referring to FIG. 4, a method for manufacturing a cylinder head, according to an exemplary form of the present disclosure, may include preparing a cylinder head casting 10 by casting in operation S1, and machining the cylinder head casting 10 by cylindrical tools 31 and 32 in operation S2.

Figure 5:
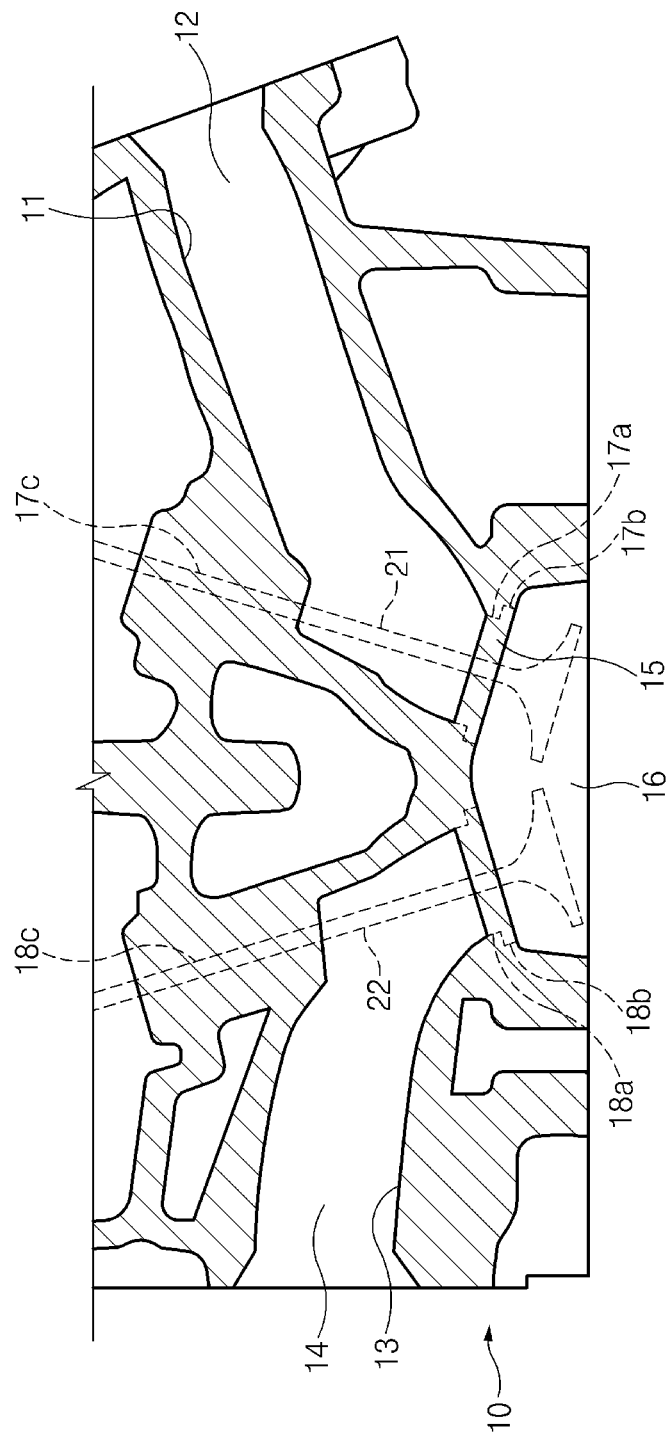
FIG. 5 illustrates a cross-sectional view of a cylinder head casting for a cylinder head according to an exemplary form of the present disclosure.

As illustrated in FIG. 5, the cylinder head casting 10 having an intake passage 11, an exhaust passage 13, and a combustion chamber 15 may be prepared by mounting an intake core 12 for molding the intake passage 11, an exhaust core 14 for molding the exhaust passage 13, a combustion chamber core 16 for molding the combustion chamber 15, and a variety of other cores in a mold, pouring molten metal into the mold, curing the same for a predetermined period of time, and separating the mold and the plurality of cores 12, 14, and 16 in operation S1.

Figure 6:
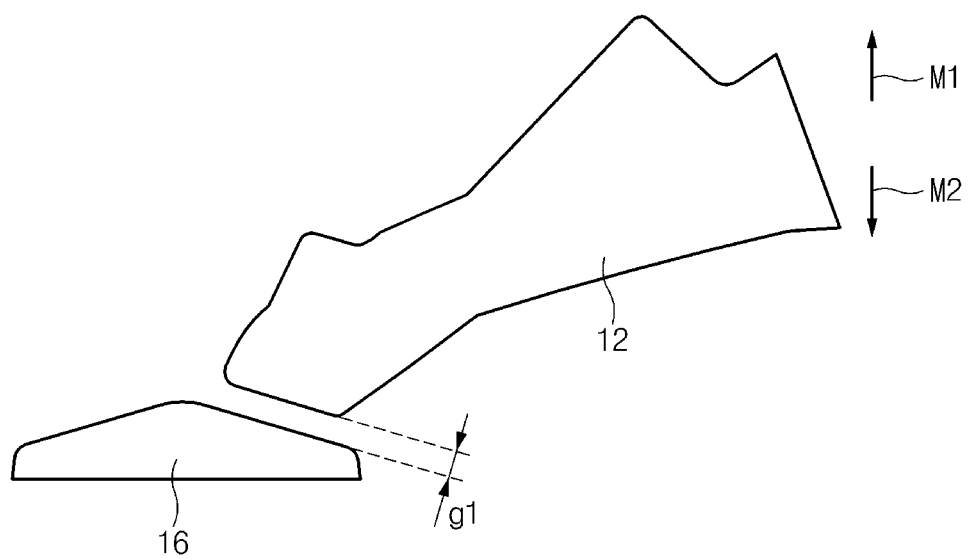
FIG. 6 illustrates a gap between an intake core and a combustion chamber core when the cylinder head casting of FIG. 5 is cast.

When the cylinder head casting 10 is cast, the intake core 12 may be slightly raised in a direction of arrow "M1" in FIG. 6 or be slightly lowered in a direction of arrow "M2" in FIG. 6 due to thermal load by the temperature of the molten metal, deformation of the mold, the pressure of the molten metal, and the like, so that a gap "g1" between the intake core 12 and the combustion chamber core 16 may be changed. This may cause a casting tolerance in the gap g1 between the intake passage 11 and the combustion chamber 15 in the cylinder head casting 10.

As illustrated in FIG. 4, an intake port 17a and an intake valve seat 17b may be machined between the intake passage 11 and the combustion chamber 15 by a first cylindrical tool 31, and an intake valve guide bore 17c may be machined in the upper part of the intake passage 11 by the first cylindrical tool 31. The intake port 17a may be disposed between the intake passage 11 and the combustion chamber 15, and the intake valve seat 17b may be continuously formed below the intake port 17a. The intake valve guide bore 17c may guide the movement of an intake valve 21, and the intake valve seat 17b may be opened and closed by the movement of the intake valve 21.

An exhaust port 18a and an exhaust valve seat 18b may be machined between the exhaust passage 13 and the combustion chamber 15 by the rotation of the first cylindrical tool 31, and an exhaust valve guide bore 18c may be machined in the upper part of the exhaust passage 13 by the rotation of the first cylindrical tool 31. The exhaust port 18a may be disposed between the exhaust passage 13 and the combustion chamber 15, and the exhaust valve seat 18b may be continuously formed below the exhaust port 18a. The exhaust valve guide bore 18c may guide the movement of an exhaust valve 22, and the exhaust valve seat 18b may be opened and closed by the movement of the exhaust valve 22.

Figure 7:
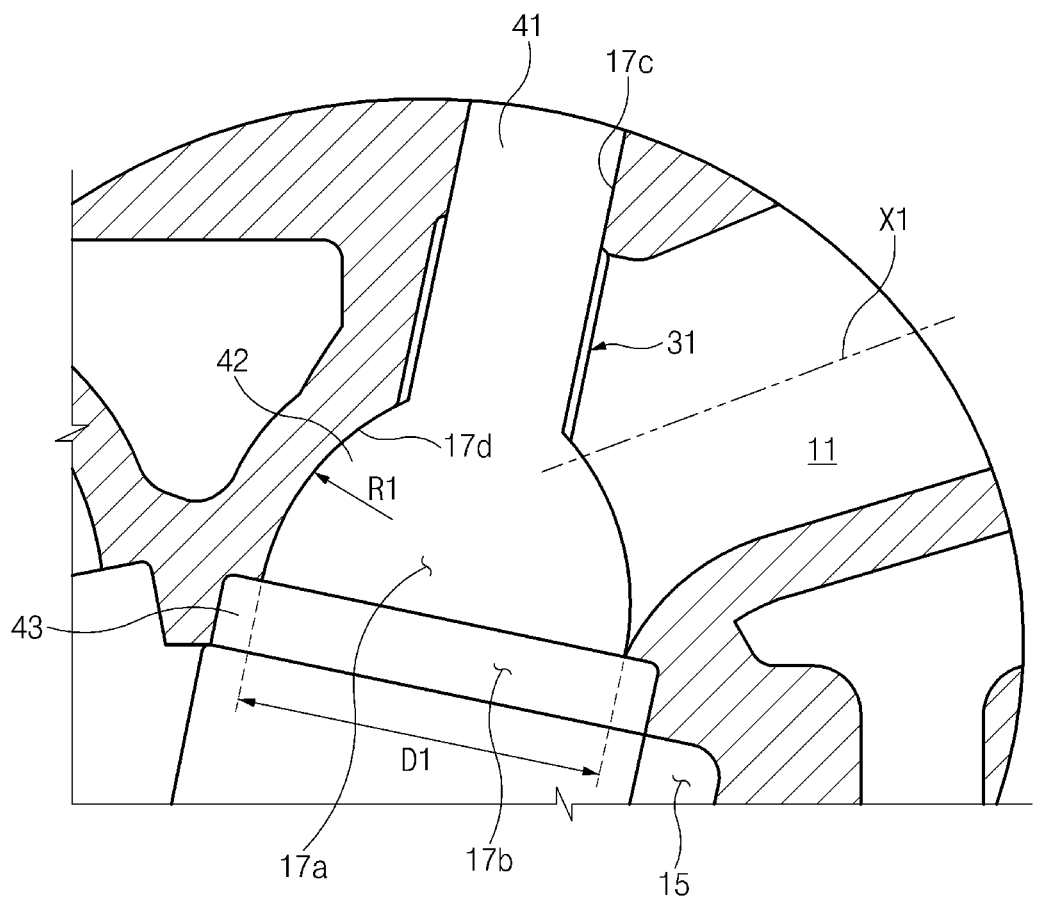
FIG. 7 illustrates a process for machining an intake port, an intake valve seat, and an intake valve guide bore by a first cylindrical tool in a method for manufacturing a cylinder head according to an exemplary form of the present disclosure.
Figure 8:
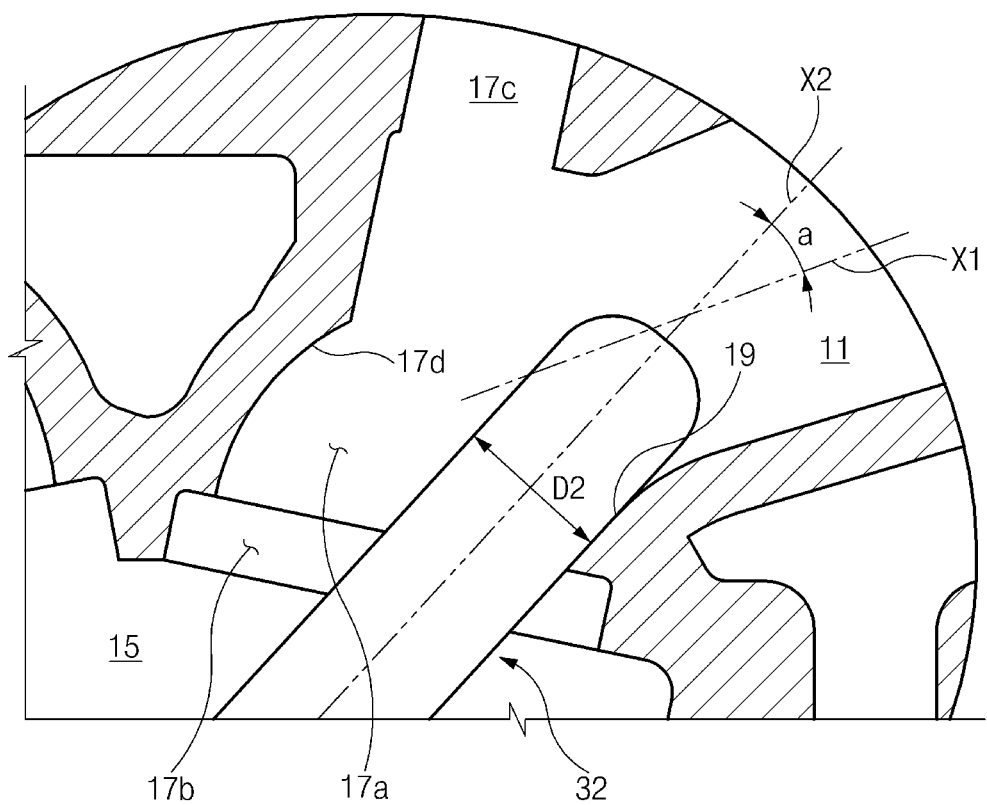
FIG. 8 illustrates a process for machining a tapered surface of an intake port by a second cylindrical tool in a method for manufacturing a cylinder head according to an exemplary form of the present disclosure.

Referring to FIGS. 7 and 8, the intake port 17a, the intake valve seat 17b, the intake valve guide bore 17c, the exhaust port 18a, the exhaust valve seat 18b, and the exhaust valve guide bore 18c may be machined in the cylinder head casting 10 by the first cylindrical tool 31 in operation S2.

Referring to FIG. 7, the first cylindrical tool 31 may cut a portion between the combustion chamber 15 and the intake passage 11 to thereby machine the intake valve guide bore 17c guiding the intake valve, the intake port 17a, and the intake valve seat 17b.

The first cylindrical tool 31 may have a first cutting portion 41 for machining the intake valve guide bore 17c and the exhaust valve guide bore 18c, a second cutting portion 42 for machining the intake port 17a and the exhaust port 18a, and a third cutting portion 43 for machining the intake valve seat 17b and the exhaust valve seat 18b.

The first cutting portion 41 may have an outer diameter corresponding to a diameter of the intake valve guide bore 17c, and the first cutting portion 41 may have a cylindrical drill structure for cutting the intake valve guide bore 17c.

The second cutting portion 42 may be a hemispherical cutter having a predetermined radius "R1" provided on a lower portion of the first cutting portion 41 so that the second cutting portion 42 may machine the intake port 17a and an upper region 17d of the intake port 17a adjacent to the intake valve guide bore 17c so as to be rounded with the predetermined radius R1.

The third cutting portion 43 may be provided on a lower portion of the second cutting portion 42 to be integrated therewith, and have a cylindrical cutter structure having a diameter corresponding to an inner diameter of the intake valve seat 17b so that the third cutting portion 43 may cut the intake valve seat 17b.

Similar to the method for machining the intake valve guide bore 17c, the intake port 17a, and the intake valve seat 17b, the first cylindrical tool 31 may cut a portion between the combustion chamber 15 and the exhaust passage 13 to thereby machine the exhaust valve guide bore 18c, the exhaust port 18a, and the exhaust valve seat 18b.

Referring to FIG. 8, by cutting at least a portion of edge of the intake port 17a (an edge portion located opposite to the intake valve guide bore 17c) along a circumferential direction of the intake port 17a by a second cylindrical tool 32, a tapered surface 19 of the intake port 17a may be precisely machined. The tapered surface 19 may be located opposite to the intake valve guide bore 17c. The tapered surface 19 may serve to improve the swirl and tumble ratio of the intake air.

Figure 9:
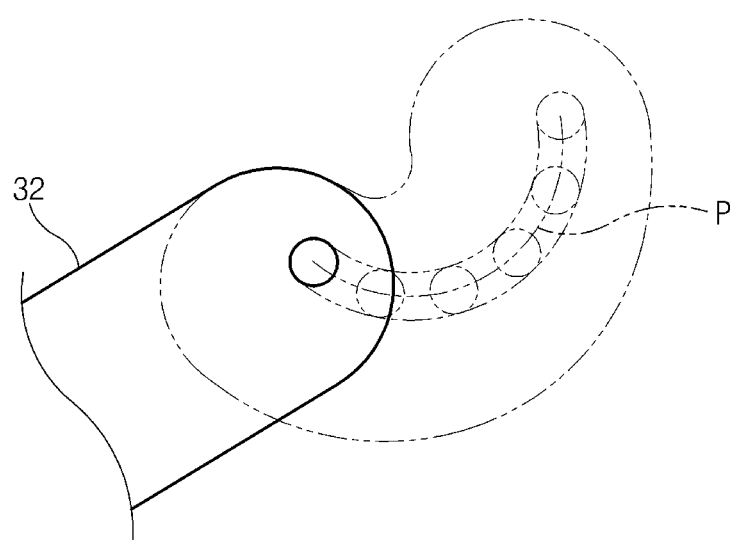
FIG. 9 illustrates a state in which the second cylindrical tool of FIG. 8 moves along a trajectory.

The second cylindrical tool 32 may have a cutting surface or a grinding surface formed on an outer surface thereof, and a diameter "D2" of the second cylindrical tool 32 may be smaller than an inner diameter of the intake passage 11. As illustrated in FIG. 9, the second cylindrical tool 32 may rotate around an axis "X2" thereof while moving along a predetermined movement trajectory "P" at the edge portion of the intake port 17a so that the tapered surface 19 of the intake port 17a may be machined to an arc shape. The movement trajectory P may be predetermined to correspond to a contour of at least a portion of edge of the intake port 17a.

Figure 11:
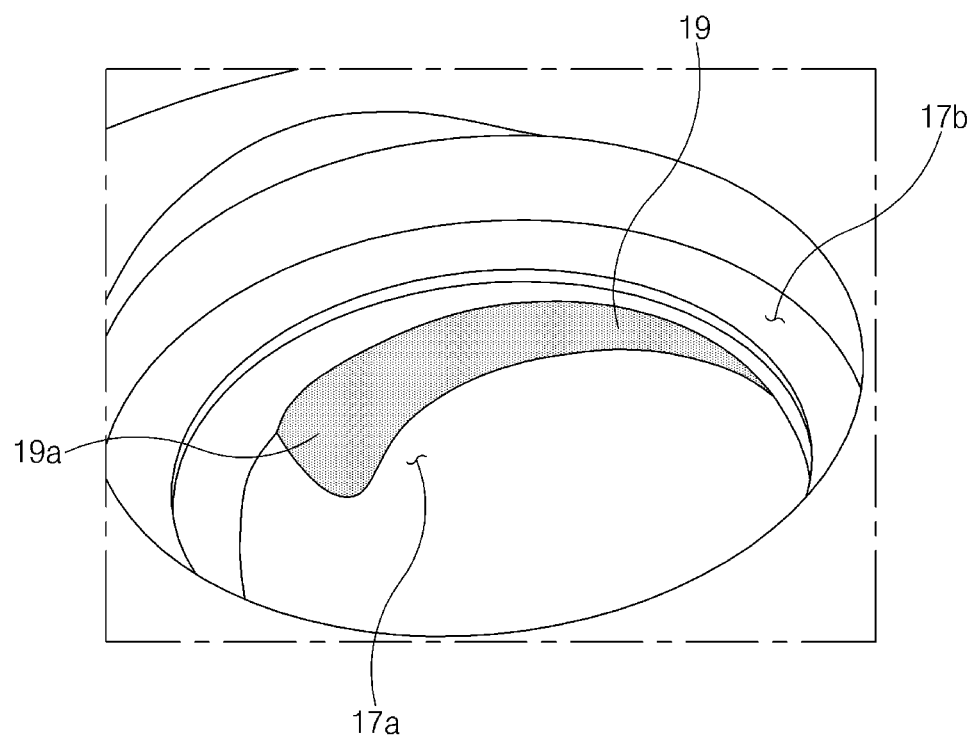
FIG. 11 illustrates a view in a direction of arrow A of FIG. 10.
Figure 12:
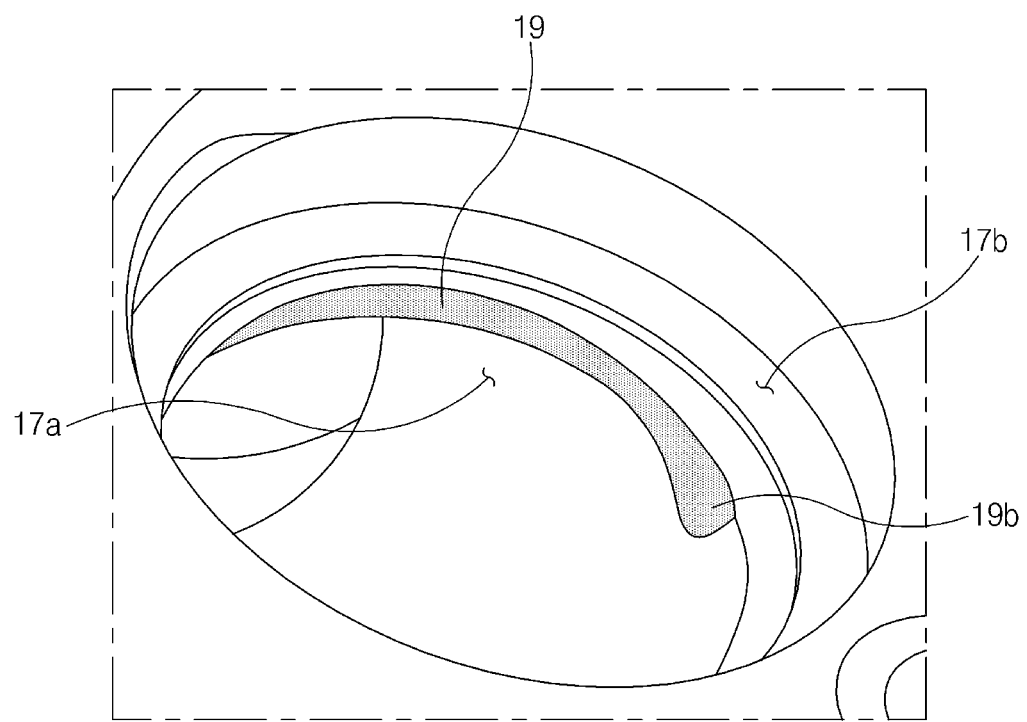
FIG. 12 illustrates a view in a direction of arrow B of FIG. 10.

As the second cylindrical tool 32 machines the tapered surface 19 by moving along the predetermined trajectory P and rotating around its axis X2 simultaneously, a first enlarged end portion 19a may be formed at one end of the tapered surface 19 (see FIG. 11), and a second enlarged end portion 19b may be formed at the other end of the tapered surface 19 (see FIG. 12). The first and second enlarged end portions 19a and 19b may have a width greater than or equal to a width of a central portion of the tapered surface 19.

As described above, the second cylindrical tool 32 may move along the predetermined trajectory P and rotate around its axis X2 simultaneously, so that the shape and dimensions of the tapered surface 19 may be made uniform so as to conform to designed shape and dimensions even if the gap g1 between the intake core 12 and the combustion chamber core 16 is changed as illustrated in FIG. 6 (that is, even if the casting tolerance of the cylinder head casting 10 occurs).

The diameter D2 of the second cylindrical tool 32 may be smaller than a diameter "D1" of the second cutting portion 42 of the first cylindrical tool 31. In particular, the diameter D2 of the second cylindrical tool 32 may be smaller than a half (D1/2) of the diameter D1 of the second cutting portion 42 (D2<D1/2).

As illustrated in FIG. 8, when the tapered surface 19 is machined by the second cylindrical tool 32, the axis X2 of the second cylindrical tool 32 may intersect with an axis "X1" of the intake passage 11 at a predetermined angle "a", so that the tapered surface 19 of the intake port 17a may be precisely machined.

Figure 10:
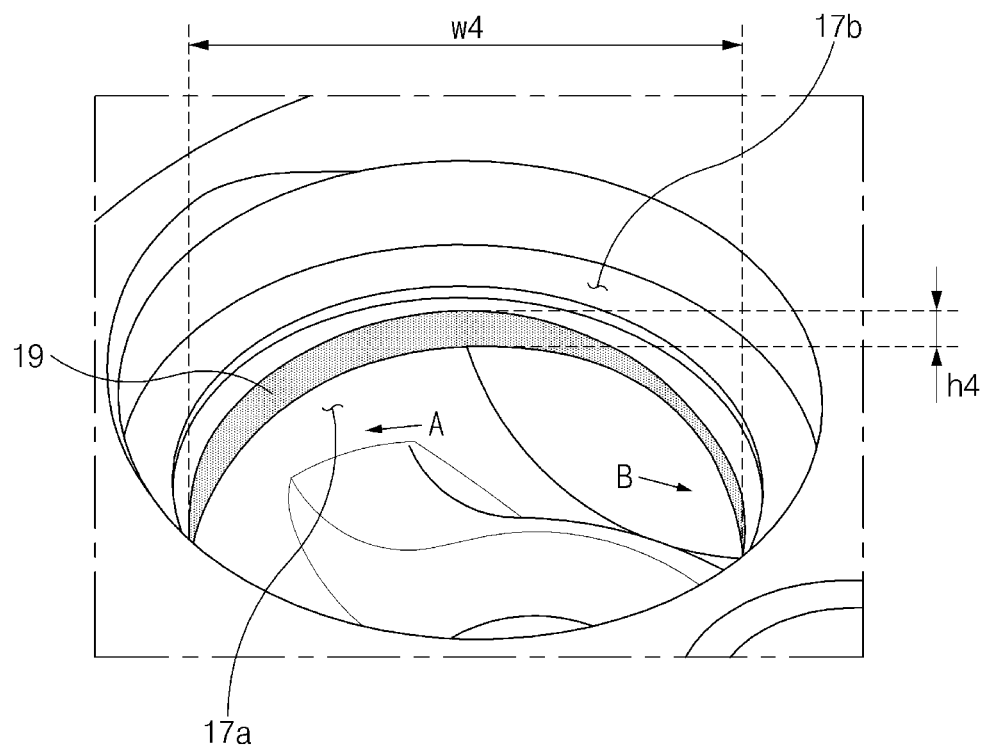
FIG. 10 illustrates a perspective view of a tapered surface of an intake port machined by a second cylindrical tool in a method for manufacturing a cylinder head according to an exemplary form of the present disclosure.

FIGS. 10 to 12 illustrate the shape of the tapered surface 19 of the intake port 17a machined by the second cylindrical tool 32.

As illustrated in FIG. 10, the arc-shaped tapered surface 19 may have a designed width "w4" and a designed height "h4". The tapered surface 19 may have the first enlarged end portion 19a (see FIG. 11) and the second enlarged end portion 19b (see FIG. 12) formed at respective end portions thereof, and the width of each of the first and second enlarged end portions 19a and 19b may be greater than or equal to the width of the central portion of the tapered surface 19 so that the inflow of the intake air may be smoothly made from the intake passage 11 to the combustion chamber 15 through the tapered surface 19. Thus, the flow coefficient (CF) and tumble ratio of the intake air may be improved.

Figure 2:
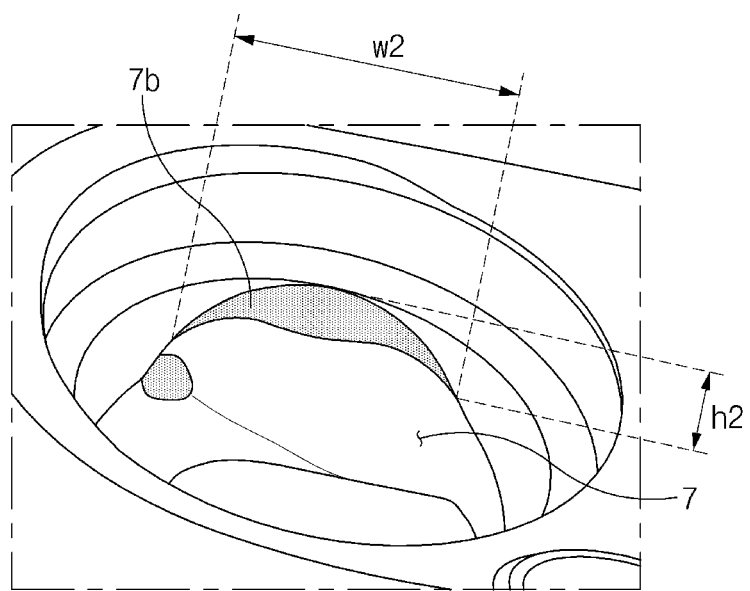
FIG. 2 illustrates a shape of a tapered surface of an intake port which is machined to be larger than that illustrated in FIG. 1, due to casting tolerance of a casting structure for a cylinder head.
Figure 3:
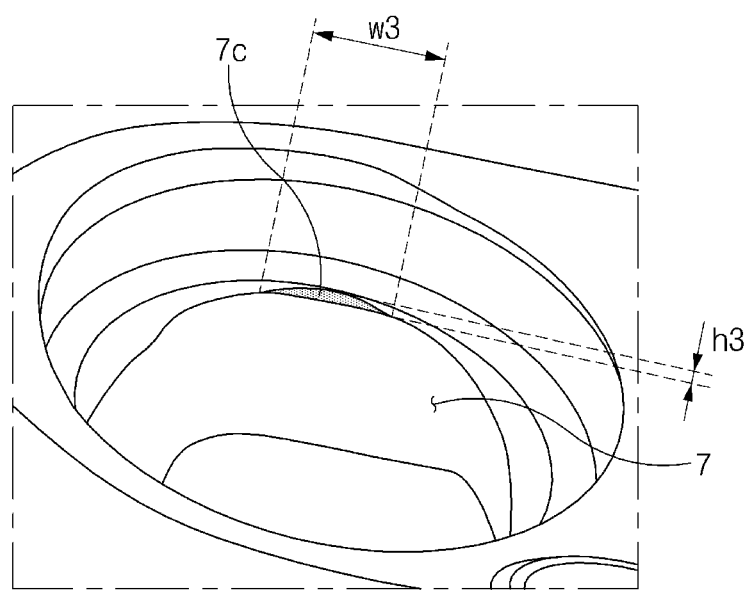
FIG. 3 illustrates a shape of a tapered surface of an intake port which is machined to be smaller than that illustrated in FIG. 1, due to casting tolerance of a casting structure for a cylinder head.

On the other hand, the tapered surface 7a (see FIGS. 1, 2, and 3) in the related art may be machined by the rotation of the second cylindrical tool so that the tapered surface 7a may be formed to have a crescent shape in which the width of each end portion of the tapered surface 7a is smaller than the width of the central portion of the tapered surface 7a. Thus, the tapered surface 7a according to the related art may have a reduction in the flow of the intake air, compared to the tapered surface 19 in one form of the present disclosure.

A cylinder head manufactured by the above-described method according to an exemplary form of the present disclosure may include, as illustrated in FIG. 5, the combustion chamber 15, the intake passage 11 communicating with the combustion chamber 15, the intake port 17a and the intake valve seat 17b formed between the combustion chamber 15 and the intake passage 11, the intake valve 21 movable along the intake valve guide bore 17c to open and close the intake valve seat 17b, the exhaust port 18a and the exhaust valve seat 18b formed between the combustion chamber 15 and the exhaust passage 13, and the exhaust valve 22 movable along the exhaust valve guide bore 18c to open and close the exhaust valve seat 18b. The tapered surface 19 for improving the swirl and tumble ratio of the intake air may be formed on at least a portion of edge of the intake port 17a in an arc shape along the circumferential direction of the intake port 17a. The tapered surface 19 may be located opposite to the intake valve guide bore 17c. The swirl and tumble ratio of the intake air may be improved by the tapered surface 19. The first enlarged end portion 19a (see FIG. 11) may be formed at one end of the tapered surface 19, and the second enlarged end portion 19b (see FIG. 12) may be formed at the other end of the tapered surface 19. The width of each of the first and second enlarged end portions 19a and 19b may be greater than or equal to the width of the central portion of the tapered surface 19.

Table 1 shows results by comparing experimental results of the flow coefficient and tumble ratio of a cylinder head according to the related art with those of a cylinder head according to an exemplary form of the present disclosure.

TABLE 1

| | | First Cylinder | Second Cylinder | Third Cylinder | Average Value | Deviation among Cylinders |
|---|---|---|---|---|---|---|
| Related Art | Flow Coefficient | 0.402 | 0.403 | 0.405 | 0.403 | 1% |
| | Tumble Ratio | 0.69 | 0.73 | 0.68 | 0.70 | 0.05% |
| Form of Present Disclosure | Flow Coefficient | 0.400 | 0.400 | 0.399 | 0.400 | 0% |
| | Tumble Ratio | 0.70 | 0.72 | 0.68 | 0.70 | 0.04% |

As can be seen in table 1, the cylinder head according to the related art has a deviation of approximately 1% among cylinders with respect to the flow coefficient, and a deviation of approximately 0.05% among the cylinders with respect to the tumble ratio.

On the other hand, the cylinder head according to the exemplary form of the present disclosure has little deviation among cylinders with respect to the flow coefficient, and a deviation of approximately 0.04% among the cylinders with respect to the tumble ratio.

It can be seen that regardless of the casting tolerance of the cylinder head casting 10, the shape of the tapered surface 19 of the intake port 17a may be kept uniform so as to conform to the designed shape, and thus there is almost no deviation among the cylinders with respect to the flow coefficient and tumble ratio of the intake air.

As the second cylindrical tool 32 having the diameter D2 smaller than the inner diameter of the intake passage 11 and the diameter D1 of the second cutting portion 42 of the first cylindrical tool 31 moves along the predetermined trajectory P at a portion of edge of the intake port 17a to cut the tapered surface 19, the shape of the tapered surface 19 of the intake port 17a may be kept uniform without any deviation among the cylinders. By keeping the shape of the intake port 17a uniform, regardless of the casting tolerance of the cylinder head casting 10 for the cylinder head, quality and reliability in the intake port of the manufactured cylinder head may be improved. This may stabilize the flow coefficient and tumble ratio of the intake air, thereby improving the combustion characteristics.

As set forth above, the cylinder head and the method for manufacturing the same, according to exemplary forms of the present disclosure, may keep the shape of each intake port of the cylinder head uniform, regardless of the casting tolerance of the cylinder head casting, thereby improving quality and reliability in the intake port of the manufactured cylinder head, and stabilizing the flow coefficient and tumble ratio of the intake air.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A method for manufacturing a cylinder head, the method comprising:
    preparing a cylinder head casting having an intake passage, an exhaust passage, and a combustion chamber by casting using a mold and a plurality of cores;
    machining an intake port, an intake valve seat, an intake valve guide bore, an exhaust port, an exhaust valve seat, and an exhaust valve guide bore in the cylinder head casting by a first cylindrical tool; and
    forming a tapered surface on a portion of an edge of the intake port by a second cylindrical tool,
    wherein the second cylindrical tool moves along a predetermined trajectory at the portion of the edge of the intake port and rotates around an axis thereof simultaneously to machine the tapered surface, and
    wherein the first cylindrical tool has a first cutting portion configured to cut the intake valve guide bore, a second cutting portion configured to cut the intake port, and a third cutting portion configured to cut the intake valve seat.

2. The method according to claim 1, wherein the second cylindrical tool has a diameter smaller than an inner diameter of the intake passage.

3. The method according to claim 1, wherein the second cylindrical tool has a diameter smaller than a diameter of the second cutting portion of the first cylindrical tool.

4. The method according to claim 1, wherein when the tapered surface is machined by the second cylindrical tool, an axis of the second cylindrical tool intersects with an axis of the intake passage at a predetermined angle.

* * * * *